United States Patent
Soo et al.

(10) Patent No.: US 9,643,512 B2
(45) Date of Patent: May 9, 2017

(54) VEHICLE BATTERY CHARGE PREPARATION FOR POST-DRIVE CYCLE POWER GENERATION

(71) Applicant: Ford Global Technologies, LLC, Dearborn, MI (US)

(72) Inventors: Brian Thomas Soo, West Bloomfield, MI (US); Walter Joseph Ortmann, Saline, MI (US); Marvin Paul Kraska, Dearborn, MI (US); Michael Duane Wallace, Chesterfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 14/623,870

(22) Filed: Feb. 17, 2015

(65) Prior Publication Data

US 2016/0236586 A1 Aug. 18, 2016

(51) Int. Cl.
*B60L 11/18* (2006.01)

(52) U.S. Cl.
CPC ....... *B60L 11/1862* (2013.01); *B60L 11/1851* (2013.01); *Y02T 10/6286* (2013.01); *Y02T 10/7005* (2013.01); *Y02T 10/7044* (2013.01)

(58) Field of Classification Search
None
See application file for complete search history.

(56) References Cited

U.S. PATENT DOCUMENTS

| | | | | |
|---|---|---|---|---|
| 7,849,944 B2 | 12/2010 | DeVault | | |
| 7,933,694 B2* | 4/2011 | Kato | ...................... | B60K 6/445 180/65.22 |
| 8,290,700 B2* | 10/2012 | Yamada | .................... | B60K 6/46 180/65.29 |
| 8,433,466 B2* | 4/2013 | Yamada | .................... | B60K 6/46 180/65.1 |
| 8,534,400 B2* | 9/2013 | Stanek | ........................ | B60L 7/18 180/65.265 |
| 8,731,752 B2* | 5/2014 | Yu | .......................... | B60W 10/26 180/65.265 |
| 2004/0232861 A1* | 11/2004 | Wakashiro | ............. | B60K 6/485 318/139 |
| 2005/0228553 A1* | 10/2005 | Tryon | ....................... | B60K 6/46 701/22 |
| 2008/0275644 A1* | 11/2008 | Macneille | ............... | B60K 6/445 701/414 |

(Continued)

*Primary Examiner* — Truc M Do
(74) *Attorney, Agent, or Firm* — David Kelley; Brooks Kushman P.C.

(57) ABSTRACT

A vehicle includes a connector for coupling a battery in the vehicle to a load external to the vehicle. An energy management system includes a controller that is programmed to operate the battery in a vehicle according to a target state of charge range that is defined by upper and lower state of charge limits. In response to receiving a request to prepare for power generation at a destination prior to arriving at the destination, the controller increases the lower state of charge limit as the distance to the destination decreases. In response to the request, the battery is operated during the drive cycle to the destination so that the battery state of charge at the destination allows the battery to provide power to the external load for a predetermined period of time before an engine is started.

17 Claims, 4 Drawing Sheets

(56) References Cited

U.S. PATENT DOCUMENTS

| | | | |
|---|---|---|---|
| 2009/0030568 A1* | 1/2009 | Amano | B60K 6/445 701/22 |
| 2009/0277701 A1* | 11/2009 | Soma | B60K 6/445 180/65.25 |
| 2010/0010697 A1* | 1/2010 | Soma | B60K 6/445 701/22 |
| 2010/0072953 A1* | 3/2010 | Mitsutani | B60L 11/1816 320/152 |
| 2010/0131139 A1* | 5/2010 | Sakai | B60K 6/46 701/22 |
| 2010/0324765 A1* | 12/2010 | Iida | H01M 10/486 701/22 |
| 2011/0066308 A1* | 3/2011 | Yang | B60W 20/12 701/22 |
| 2012/0010768 A1* | 1/2012 | Phillips | B60L 11/123 701/22 |
| 2013/0063072 A1* | 3/2013 | Shirasaka | H01M 8/0488 320/101 |
| 2014/0070606 A1* | 3/2014 | Gibeau | B60L 11/1862 307/9.1 |
| 2014/0257608 A1* | 9/2014 | Dufford | B60W 20/40 701/22 |

* cited by examiner

VEHICLE BATTERY CHARGE PREPARATION FOR POST-DRIVE CYCLE POWER GENERATION

TECHNICAL FIELD

This application relates to control of a hybrid vehicle powertrain to provide power to external devices.

BACKGROUND

Hybrid vehicles combine traditional fuel-powered engines with electric motors to improve fuel economy. To achieve better fuel economy, a hybrid vehicle includes a traction battery that stores energy for use by the electric motors. During normal operation, the state of charge of the battery may fluctuate. The battery may be charged while driving by controlling the engine and a generator to provide power to the battery. Additionally, a plug-in hybrid may recharge the battery by plugging in to an external power supply.

A hybrid vehicle may also be adapted to provide power to loads external to the vehicle. The vehicle may have a plug-out mode where an external load can be connected to the vehicle. In the plug-out mode, the vehicle provides power to the external load. One possible application may be to provide electrical power to a house as a backup generator. For example, the vehicle power bus may be connected to an external inverter that converts DC voltage to an AC voltage compatible with household devices. The traction battery may provide the power or the engine may be operated to drive a generator to provide the external power.

SUMMARY

A vehicle includes a battery and a controller programmed to, in response to receiving a request to prepare for power generation at a destination prior to arriving at the destination, operate the battery according to a target state of charge (SOC) range defined by upper and lower SOC limits during a drive cycle to the destination, and increase the lower SOC limit as a distance to the destination decreases. The controller may be further programmed to, in response to receiving the request, increase the upper SOC limit to a predetermined SOC. The controller may be further programmed to increase the lower SOC limit at a rate such that the lower SOC limit converges with the upper SOC limit upon reaching the destination. The controller may be further programmed to request operation of an engine and an electric machine to drive a SOC of the battery to fall within the target SOC range. The controller may be further programmed to operate the battery such that the SOC of the battery upon arriving at the destination is greater than a predetermined SOC, and after arriving at the destination, operate the battery to power a load external to the vehicle without the engine running for at least a predetermined time before requesting operation of the engine and the electric machine to charge the battery and power the load. The controller may be further programmed to begin increasing the lower SOC limit at a predetermined distance from the destination. The controller may be further programmed to decrease the lower SOC limit to a predetermined value in response to power generation at the destination.

An energy management system includes a controller programmed to, in response to receiving a request to prepare for power generation at a destination prior to arriving at the destination, operate a battery according to a target state of charge (SOC) range defined by upper and lower SOC limits during a drive cycle to the destination, and increase the lower SOC limit as a distance to the destination decreases. The controller may be further programmed to, in response to receiving the request, increase the upper SOC limit to a predetermined SOC. The controller may be further programmed to increase the lower SOC limit at a rate such that the lower SOC limit converges with the upper SOC limit upon reaching the destination. The controller may be further programmed to operate the battery such that the SOC of the battery upon arriving at the destination is greater than a predetermined SOC, and after arriving at the destination, operate the battery to power a load external to the vehicle without the engine running for at least a predetermined time before requesting operation of the engine and the electric machine to charge the battery and power the load. The controller may be further programmed to begin increasing the lower SOC limit at a predetermined distance from the destination. The controller may be further programmed to decrease the lower SOC limit to a predetermined value in response to power generation at the destination.

A method includes operating, by a controller, a battery of a vehicle according to a target state of charge (SOC) range defined by upper and lower SOC limits during a drive cycle to a destination. The method further includes increasing, by the controller, the lower SOC limit as a distance to the destination decreases in response to receiving a request to prepare for power generation at the destination prior to arriving at the destination. The method may further include increasing, in response to receiving the request, the upper SOC limit to a predetermined SOC. The rate of change of the lower SOC limit may be such that the lower SOC limit converges with the upper SOC limit upon arriving at the destination. The method may further include requesting, by the controller, operation of an engine and an electric machine to control a state of charge of the battery to the target SOC range. The method may further include operating, by the controller, the battery to power an external load after arriving at the destination without requesting operation of an engine and an electric machine for at least a predetermined time. The method may further include decreasing, by the controller, the lower SOC limit to a previous value when power generation at the destination begins. The method may further include increasing, by the controller, the lower SOC limit according to the distance from the destination when the distance from the destination is less than a predetermined distance.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
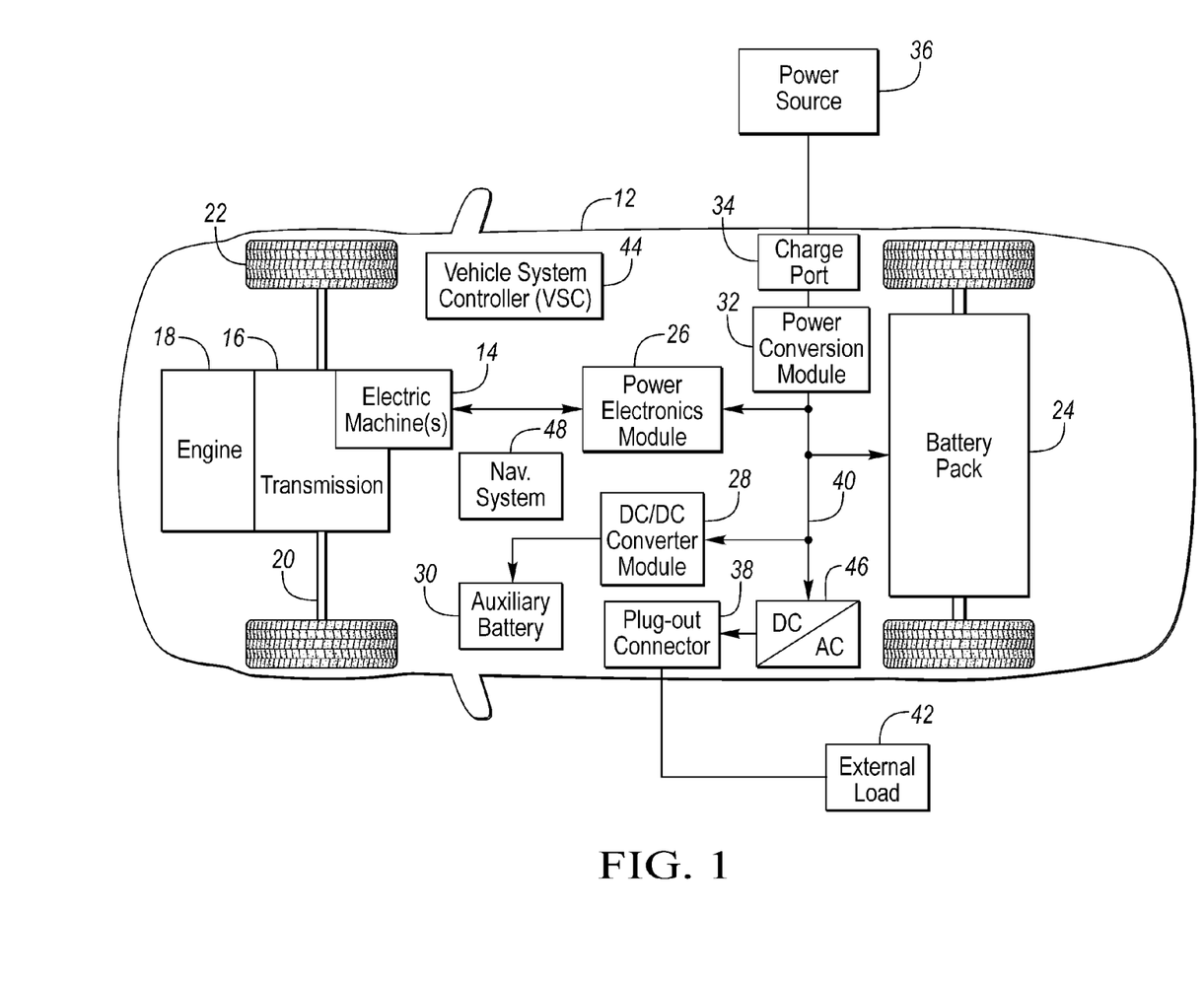
FIG. 1 is a diagram of a plug-in hybrid-electric vehicle illustrating typical drivetrain and energy storage components.

FIG. 1 depicts a typical hybrid-electric vehicle (HEV). A typical hybrid-electric vehicle 12 may comprise one or more electric machines 14 mechanically connected to a hybrid transmission 16. The electric machines 14 may be operable as a motor and a generator. In addition, the hybrid transmission 16 is mechanically coupled to an engine 18. The hybrid transmission 16 may also be mechanically coupled to a drive shaft 20 that is mechanically coupled to the wheels 22. The electric machines 14 may provide propulsion and deceleration capability when the engine 18 is turned on or off. The electric machines 14 may act as generators and can provide fuel economy benefits by recovering energy that would normally be lost as heat in the friction braking system. The electric machines 14 may also provide reduced pollutant emissions since the hybrid electric vehicle 12 may be operated in an all-electric mode under certain conditions.

In certain modes of operation, at least one of the electric machines 14 may act as an onboard generator. The shaft of the electric machine 14 may be driven by the engine 18, either directly or through the hybrid transmission 16. The power output of the engine 18 is a function of the engine torque and the engine speed. The mechanical energy created by the engine 18 may be converted to electrical energy through the electric machine 14 acting as a generator. The power output by the electric machine 14 is a function of the electric machine speed and the electric machine torque.

The battery pack 24 stores energy that can be used by the electric machines 14. A vehicle battery pack or traction battery 24 typically provides a high voltage DC output. A high-voltage bus 40 may be defined for connecting loads requiring high-voltage. The battery pack 24 may be electrically coupled to the high-voltage bus 40 to provide power to and receive power from the high-voltage bus 40. The high-voltage bus 40 may represent a connection point for loads that require a connection to high-voltage power. One or more power electronics modules 26 may be electrically connected to the high-voltage bus 40 and may be configured to provide power to and receive power from the high-voltage bus 40. The power electronics module 26 may be electrically connected to the electric machines 14 and provides the ability to bi-directionally transfer energy between the high-voltage bus 40 and the electric machines 14. For example, a typical battery pack 24 may provide a DC voltage while the electric machines 14 may utilize a three-phase AC current to operate. The power electronics module 26 may convert the DC voltage to a three-phase AC current as used by the electric machines 14. In a regenerative mode, the power electronics module 26 may convert the three-phase AC current from the electric machines 14 acting as generators to the DC voltage used by the battery pack 24.

In addition to providing energy for propulsion, the battery pack 24 may provide energy for other vehicle electrical systems. A typical system may include a DC/DC converter module 28 that converts the high-voltage DC output of the battery pack 24 to a low-voltage DC supply that is compatible with other vehicle loads. The DC/DC converter module 28 may be electrically connected to the high-voltage bus 40 and be configured to provide power to and receive power from the high-voltage bus 40. Other high-voltage loads, such as compressors and electric heaters, may be connected directly to the high-voltage bus 40. In a typical vehicle, the low-voltage systems are electrically connected to an auxiliary battery (e.g., 12V) 30. The auxiliary battery 30 may be at any voltage suitable for the particular vehicle application (e.g., 24V, 48V, etc.).

The vehicle may be a plug-in HEV in which the battery pack 24 may be recharged by an external power source 36. The external power source 36 may provide AC or DC power to the vehicle 12 by electrically connecting through a charge port 34. The charge port 34 may be any type of port configured to transfer power from the external power source 36 to the vehicle 12. The charge port 34 may be electrically connected to a power conversion module 32. The power conversion module 32 may condition the power from the external power source 36 to provide the proper voltage and current levels to the battery pack 24. In some applications, the external power source 36 may be configured to provide the proper voltage and current levels to the battery pack 24 and the power conversion module 32 may not be present. In some configurations, the functions of the power conversion module 32 may reside in the external power source 36.

One or more controllers may be present in the vehicle to control the operation of the various components. A Vehicle System Controller (VSC) 44 is shown as part of the vehicle 12. Other controllers are not shown in the figures. The controllers may communicate with one another via one or more communication links. The communication link may be a wired connection that connects the controllers of the vehicle 12 such that the data may be transmitted and received between controllers. The communication link may be a serial bus, such as a controller area network (CAN). Communications may also be via discrete hardware signals between controllers. A combination of serial and discrete communication signals may also be utilized.

For example, the various components within the vehicle 12 may each have one or more associated controllers. The engine 18 may have an associated controller to control and manage operation of the engine 18. The engine controller may monitor signals associated with the engine 18 such as engine speed and engine torque. The engine controller may control various aspects of the engine 18 operation.

The transmission 16 may have an associated controller to control and manage operation of the transmission 16. The transmission controller may monitor signals associated with the transmission 16 such as transmission output speed, fluid level, and gear positions. The transmission controller may control various aspects of the transmission 16 operation.

The Power Electronics Module 26 may have an associated controller to control and manage operation of the module and the electric machines 14. The power electronics controller may monitor signals associated with the electric machines 14, such as speed, current, voltage, and temperature. The power electronics controller may also monitor signals associated with the power electronics such as the DC bus voltage. The power electronics controller may also control various aspects of the electric machine 14 operation.

The vehicle may have at least one controller 44 to manage and control the operation of the various components. The controller may be the VSC 44. The VSC 44 may be connected to other controllers via a communication link (not shown). The VSC 44 may coordinate the operation of the other controllers to achieve vehicle level objectives.

Figure 2:
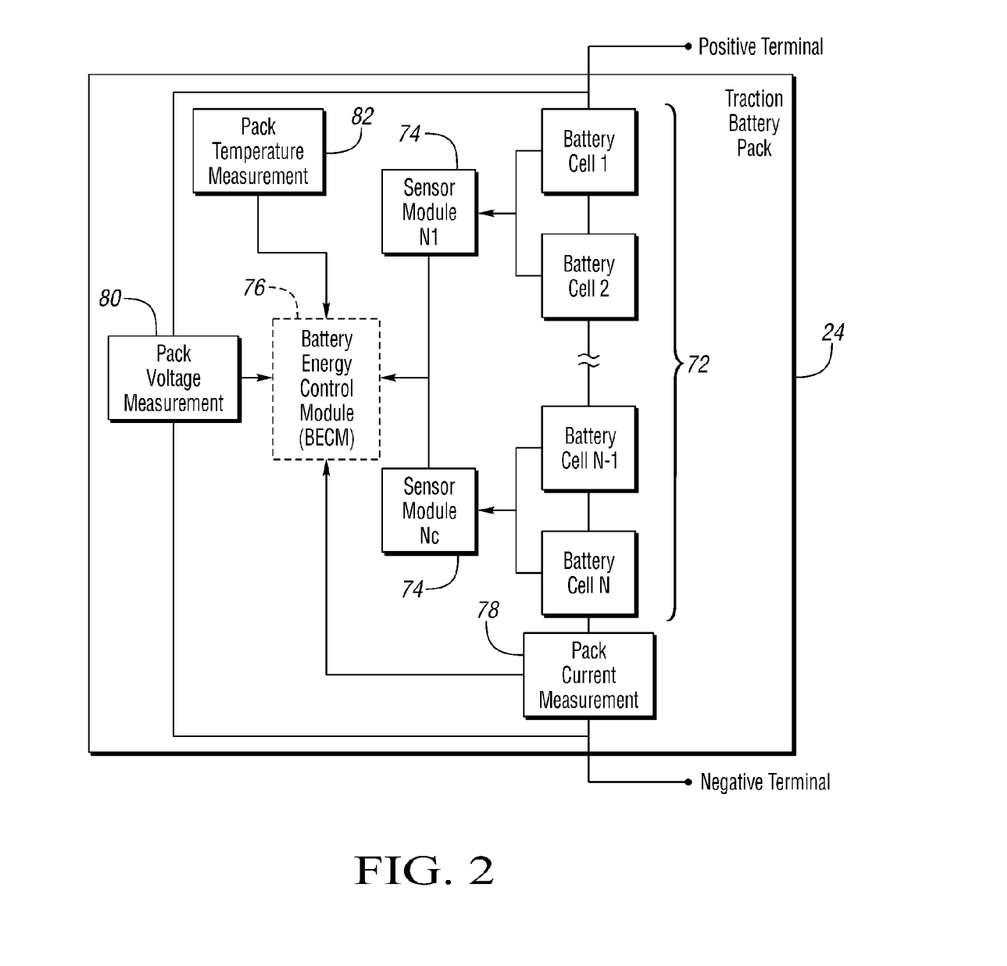
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other battery packs 24, however, may be composed of any number of individual battery cells connected in series or parallel or some combination thereof. A typical system may have a one or more controllers, such as a Battery Energy Control Module (BECM) 76 that monitors and controls the performance of the traction battery 24. The BECM 76 may monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to $N_c$ sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals.

It may be useful to calculate various characteristics of the battery pack. Quantities such a battery power capability and battery state of charge may be useful for controlling the operation of the battery pack as well as any electrical loads receiving power from the battery pack. Battery power capability is a measure of the maximum amount of power the battery can provide or the maximum amount of power that the battery can receive. Knowing the battery power capability allows electrical loads to be managed such that the power requested is within limits that the battery can handle.

Battery pack state of charge (SOC) gives an indication of how much charge remains in the battery pack. The SOC may be expressed as a percentage of the total charge remaining in the battery pack. The battery pack SOC may be output to inform the driver of how much charge remains in the battery pack, similar to a fuel gauge. The battery pack SOC may also be used to control the operation of an electric or hybrid-electric vehicle. Calculation of battery pack SOC can be accomplished by a variety of methods. One possible method of calculating battery SOC is to perform an integration of the battery pack current over time. This is well-known in the art as ampere-hour integration.

Referring again to FIG. 1, the battery pack 24 may be configured to provide electric power to an external load 42 in addition to providing power for propulsion of the vehicle 12. The external load 42 may be equipment that is off-board the vehicle 12 or may be equipment that is stored or carried on the vehicle. The external load 42 may be external to the hybrid powertrain and the vehicle 12. For example, the external load 42 may be a device that is carried by or attached to the vehicle 12 that requires power to be provided by the vehicle 12. This mode of operation is referred to as a plug-out mode of operation. In this mode, energy may be provided for external uses by plugging into the high voltage bus 40 of the vehicle. The engine 18 and electric machine 14 operated as a generator may also be used to provide power from the vehicle 12.

In some configurations, the vehicle may include a DC/AC converter 46 that is coupled to the high-voltage bus 40. The DC/AC converter 46 may convert DC voltage from the high-voltage bus 40 to an alternating (AC) voltage to a plug-out connector module 38. The DC/AC converter 46 may include a controller that manages the voltage conversion operation. The DC/AC converter 46 may include switching devices to convert the voltage. For example, in some configurations, the DC/AC converter may output a 60 Hz, 110 Volt AC power signal similar to that provided from an electric utility. In some configurations, the DC/AC conversion function may be located in the external load 42.

The plug-out connector module 38 may enable connection of an external device or load 42 to the vehicle 12. The plug-out connector module 38 may be controlled by a controller such as the VSC 44. The plug-out connector module 38 may provide isolation capability when the plug is not in use. The plug-out connector module or port 38 may control the delivery of high-voltage to the external load 42. The plug-out connector module 38 may enable and disable high voltage that is passed to the external load 42. The plug-out connector port 38 may have the capability to selectively connect the output of the DC/AC converter 46 to the external load 42. The plug-out connection port 38 may provide a connection point for connecting the external load 42 to the vehicle 12. The port 38 may provide connections for high voltage and for communications between the vehicle 12 and the external load 42. The plug-out connector module 38 may provide an indication to other controllers that an external load 42 is connected to the vehicle 12.

In a plug-out mode of operation, the vehicle 12 may be stationary. In some situations, the engine 18 may be running to power the electric machine 14 acting as a generator. For example, the engine 18 may run when the battery SOC is below a charge level that can support the external load power draw. The following description is based on operating the electric machine 14 as a generator, so the term generator may be used interchangeably with the term electric machine 14 in the following description. The hybrid powertrain may be configured such that one or more of the electric machines 14 may be operated as a generator while the vehicle 12 is stationary. The electric machine 14 operating as a generator converts the mechanical power of the engine 18 into electrical power. The high-voltage bus 40 may be coupled to an external device 42 through the DC/AC converter 46 and the plug-out connector port 38. The engine 18 and electric machine 14 may be controlled in this mode of operation. The on-board components may be controlled to match the power draw of the external load 42. Some considerations for the control may be robustness to load variations and fuel efficiency. Such a system may be expected to maintain the battery state of charge for later driving purposes as well as provide sufficient power to the external loads. The engine 18 and generator 14 may be controlled to provide a varying level of power to an external load 42 in the most fuel efficient manner.

An energy management system may include the various components that affect operation of the battery 24. The components that may be included as part of the energy management system may be the battery 24, the engine 18, the electric machines 14, and the power electronics module 26. The energy management system may also include those components involved in charging from an external source 36 and those components involved in providing power to the external load 42. The energy management system may include one or more controllers to manage and coordinate operations of the various components. For example, the VSC 44 may coordinate the operations of the various components to perform the energy management functions. The energy management system may perform operations to provide energy to the various components and select the source of that energy. Various criteria may be utilized in selecting the energy sources and in determining which components are powered at any given time. For example, the energy may be managed such that fuel economy of the vehicle is maximized.

The battery SOC upon arrival at a destination or worksite may not be predictable. The battery SOC at the end of a drive cycle may depend on the distance, route, and traffic conditions during the drive cycle to the destination. The battery SOC may be based on factors such as fuel efficiency during the drive cycle with little thought given to power generation at the destination. If the battery SOC is relatively low upon reaching the destination, the engine may begin running soon after the external equipment 42 begins drawing power. This may give the perception that the vehicle is not fuel efficient in the external power generation mode. To improve this perception, it may be useful to ensure that external power may be drawn from the battery for a predetermined period of time before the engine turns on. One method of achieving this may be to ensure that the battery SOC is relatively high upon reaching the destination or worksite.

A modified energy management strategy may be implemented to ensure that the battery SOC is sufficiently high upon reaching the destination. The impact of having a relatively high battery SOC at the destination is that the battery may power the external load 42 for a period of time before the engine 18 is turned on. The modified energy management strategy may help to reduce noise and emissions at the destination when power is provided to external loads 42.

The vehicle 12 may include a navigation system 48 that includes a vehicle position sensor such as Global Positioning System (GPS). The navigation system 48 may include a user interface. The user interface may include a display and an input mechanism. The input mechanism may include buttons, a keypad, or touch screen menus. The operator may enter a destination location via the input mechanism. The navigation system 48 may be connected to other controllers via a communication link (not shown). The navigation system 48 may provide an interface that allows the operator to enter a destination and select if a power generation preparatory mode is to be activated during the drive cycle to the destination. For example, the input mechanism may be a keyboard, a keypad, or a touchscreen.

Figure 5:
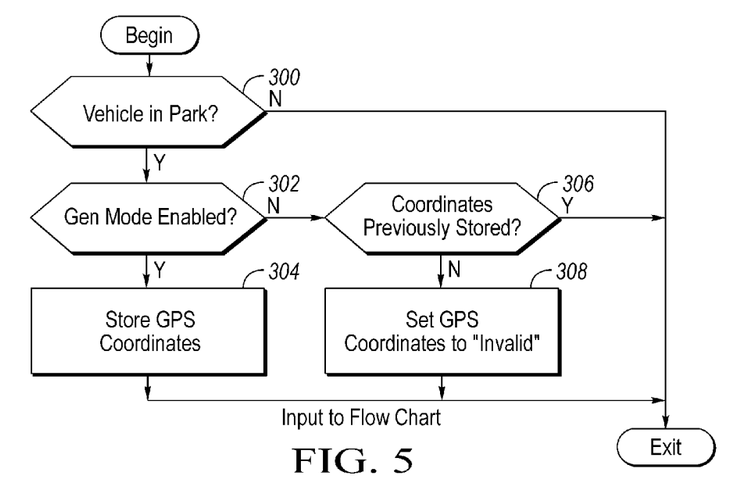
FIG. 5 is a flow chart illustrating a possible sequence of operations for storing a list of previous destinations at which power generation was requested.

The energy management system may learn the location of destinations at which the power generation mode has been used in the past (e.g., historical power generation usage). FIG. 5 depicts a flowchart for learning destinations that utilize the power generation mode. After arriving at a destination, the vehicle system may be monitored to determine if power generation mode is entered. The energy management system may implement operation 300 to detect that the vehicle is in a stationary condition. For example, the status of the transmission 16 may be checked to verify that the transmission 16 is in Park. Operation 302 may be executed in which the system may monitor to determine if the power generation mode is enabled by the operator. If the power generation mode is enabled by the operator, operation 304 may be executed to store the location (e.g., GPS coordinates) in a stored list that is located in non-volatile memory for later use. In some configurations, the power generation mode may be entered by plugging an external load 42 into the plug-out connector 38 and drawing power.

If the power generation mode is not enabled at the destination, the system may remove a location from the stored list. For example, a location at which power generation was used in the past may not be used again. Operation 306 may be executed in which the system may compare the present location to the stored locations to determine a match. If the location was previously stored and power generation mode is not entered before leaving the location, operation 308 may be executed in which the location may be deleted from the list of stored locations.

The first step in the power generation preparatory mode may be for the operator to select a destination. The operator may select the power generation preparatory mode at a time before arriving at the destination. The previously stored locations may be displayed to the operator during the destination selection operation. The operator may enter the destination as an address via the input mechanism. A list of previous destinations may be displayed to the operator and the operator may select the destination from the list. In addition to the destination, an option for selecting the power generation preparatory mode may be displayed. The operator may select the option via the input mechanism to enable the power generation preparatory mode for the upcoming drive cycle.

Figure 3:
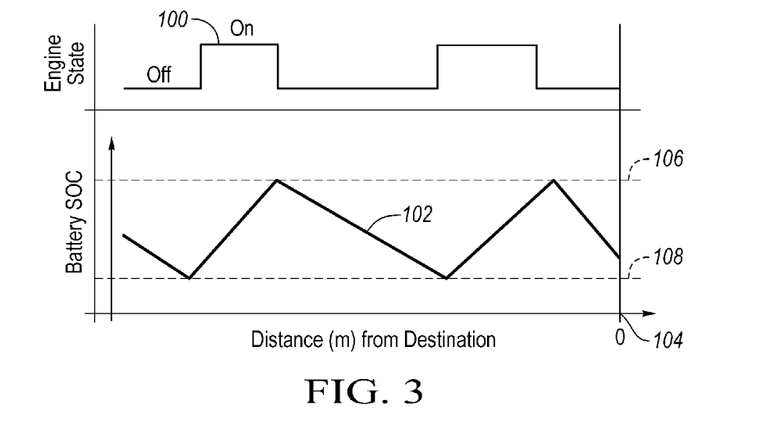
FIG. 3 is a plot illustrating the engine state and the battery state of charge for a drive cycle.

Once a destination is selected for which the power generation preparatory mode is enabled, the energy management strategy for the drive cycle to the destination may be determined. If the destination is not associated with the power generation preparatory mode, a normal or default energy management strategy may be implemented. The normal or default energy management strategy may be optimized to minimize fuel consumption. FIG. 3 depicts a possible default energy management strategy during a drive cycle to a destination. A state of the engine (e.g., engine state 100) may be based on the battery SOC. The engine state 100 and the target battery SOC 102 may be plotted as a function of a distance from the destination. The battery SOC may be expected to closely follow the target battery SOC 102. For example, the target battery SOC 102 may be limited to be between an upper SOC limit 106 and a lower SOC limit 108. The upper SOC limit 106 and the lower SOC limit 108 may be predetermined values. For example, the upper SOC limit 106 may be 60% and the lower SOC limit 108 may be 40% when operating with the default energy management strategy.

The energy management strategy may be such that the engine 18 is operated (e.g., engine is running) when the battery SOC falls below the lower SOC limit 108. The engine 18 may be in the "on" or "running" state until the battery SOC meets or exceeds the upper SOC limit 106 at which time the engine 18 may be turned off. In addition, the electric machine 14 may be operated as a generator to provide energy to charge the battery 24. Other engine operating strategies are possible and the strategy depicted is merely one example.

At the destination 104, the distance from the destination will be zero. At the destination 104, the vehicle may be parked and an external load 42 may be connected to the vehicle 12. The default strategy may not ensure that the battery SOC is at a relatively high SOC for powering the external load 42. The energy management strategy when the vehicle is parked may follow the default or normal energy management strategy. In the power generation mode, if the battery SOC starts near the lower SOC limit 108, the engine 18 may turn on soon after entering the power generation mode. This may give the perception that the external power generation mode is inefficient.

Figure 4:
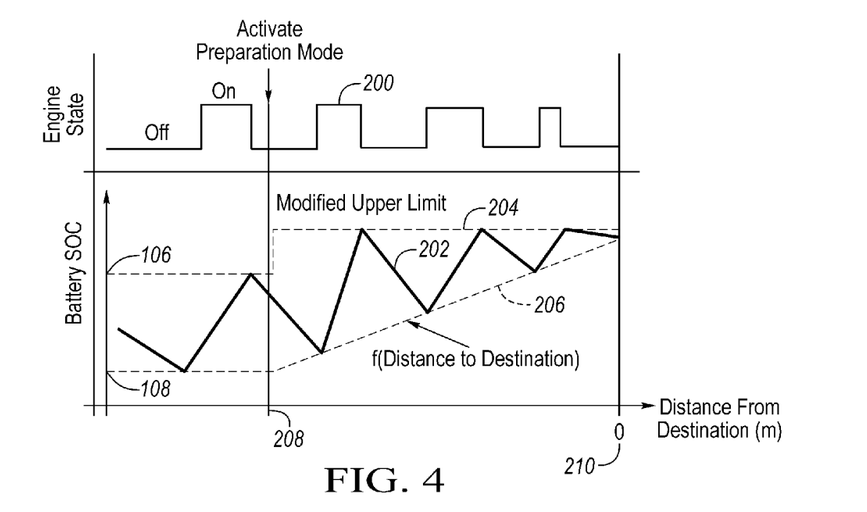
FIG. 4 is a plot illustrating the engine state and the battery state of charge for a drive cycle in which a request to prepare for power generation at the destination is received.

If the destination is associated with the power generation preparatory mode, then the energy management strategy may be modified during the drive cycle to the destination. The energy management strategy may include a modified upper SOC limit 204 and a modified lower SOC limit 206. as shown in FIG. 4. FIG. 4 depicts an energy management strategy that may be employed during the power generation preparatory mode. The state of the engine (e.g., engine state 200) may be based on the battery SOC. The power generation preparatory mode may be activated at a particular time as selected by the operator which may be referred to as an activation time 208. Prior to the activation time 208, the energy management strategy may operate with a target SOC 202 that is between the upper SOC limit 106 and the lower SOC limit 108 (e.g., the normal or default energy management thresholds).

After the activation time, 208, the upper SOC limit 106 may be increased such that the modified upper SOC limit 204 is greater than the upper SOC limit 106 for the default strategy. For example, the modified upper SOC limit 204 may be 100%. After the activation time 208, the lower SOC limit 108 may be modified by increasing the lower SOC limit 108 as the distance to the destination changes. As the distance to the destination decreases, the modified lower SOC limit 206 may converge to the modified upper SOC limit 204 (e.g., go from 60% to about 100%). Using the same engine operating strategy as for the normal strategy, the engine 18 may operate more often as the distance to the destination decreases and the battery SOC operating range between the modified upper SOC limit 204 and the modified lower SOC limit 208 decreases. When the vehicle is parked at the destination, the lower SOC limit may be restored to the pre-activation time lower SOC limit 108 (e.g., 60%).

The impact of increasing the lower SOC limit is to ensure that the battery SOC upon arriving at the destination is at a relatively high SOC. By starting at a relatively high battery SOC at the destination, more energy may be drawn from the battery pack 24 before the engine 18 turns on. This provides the perception of energy efficient operation in the plug-out mode of operation as the engine 18 does not turn on immediately. In some situations, it is possible that the external load 42 is powered without the engine 18 turning on. The period of time that the battery 24 can provide power to the external load 42 may depend on the power drawn by the external load 42 and the capacity of the battery 24.

The default upper SOC limit 106 and default lower SOC limit 108 may be chosen to maximize battery life. For example, the battery may be operated within a narrow range to extend the life of the battery 24. The limits may also be selected to optimize performance of the vehicle. In the power generation preparatory mode, the modified upper SOC limit 204 may be selected to maximize the battery charge to extend the period of time which the battery 24 may supply the external load 42. Note that these limit selection goals may conflict with each other and the limits may be selected as compromise values to achieve a best overall performance of the vehicle 12 and the battery 24.

Figure 6:
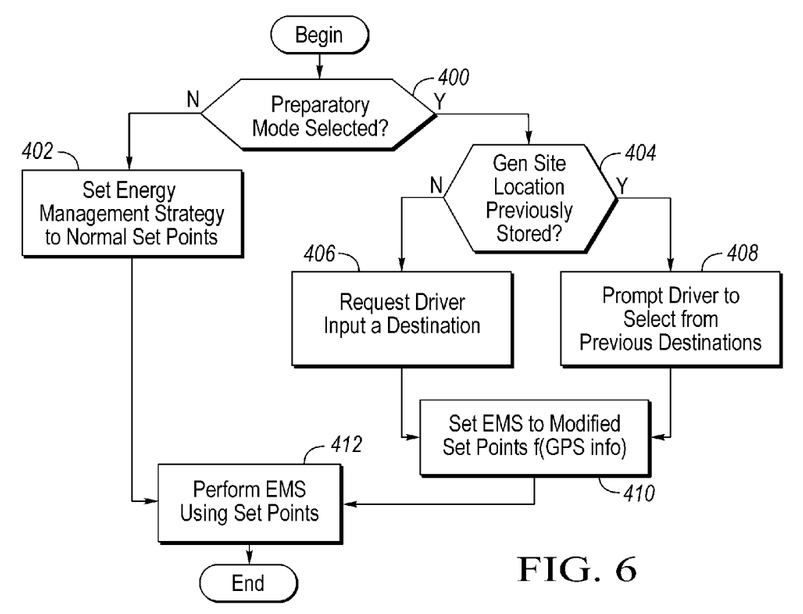
FIG. 6 is a flow chart illustrating a possible sequence of operations for selecting energy management limits during a drive cycle.

FIG. 6 depicts a flowchart of operations that may be performed to determine the energy management set points or limits. At operation 400, instructions may be executed to determine if the operator is requesting the power generation preparatory mode for the current drive cycle. If the preparatory mode is not selected, operation 402 may be executed in which the energy management limits or set points are set to the default or normal values.

If the preparatory mode is selected, then a destination may be requested from the operator. At operation 404, user input may be requested to input if the destination is a previously stored destination. If the destination is a previously stored destination, then operation 408 may be executed in which the operator is prompted to select from the list of previous destinations. If the destination is not a previously stored destination, then operation 406 may be executed in which the operator is requested to input the destination.

Once the destination is input, operation 410 may be executed in which the energy management system operating limits or set points are configured according to the destination. Once the mode of operation is determined, operation 412 may be executed to perform the energy management strategy during the drive cycle according to the selected strategy.

In some configurations, the power generation preparatory mode may be activated a predetermined distance from the destination. For example, if the destination is a significant distance from the present location, it may be desired to operate in a fuel efficient manner during the drive cycle for as long as possible. At the predetermined distance from the destination, the power generation preparatory mode may be activated to cause the state of charge to increase as the vehicle approaches the destination. In some configurations, the predetermined distance may be selected by the operator.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a battery; and
a controller programmed to, in response to receiving a request to prepare for power generation at a destination prior to arriving at the destination, operate the battery according to a target state of charge (SOC) range defined by upper and lower SOC limits during a drive cycle to the destination, and increase the lower SOC limit at a rate to converge with the upper SOC limit at the destination.

2. The vehicle of claim 1 wherein the controller is further programmed to, in response to receiving the request, increase the upper SOC limit to a predetermined SOC.

3. The vehicle of claim 1 wherein the controller is further programmed to request operation of an engine and an electric machine to drive a SOC of the battery to fall within the target SOC range.

4. The vehicle of claim 3 wherein the controller is further programmed to operate the battery such that the SOC of the battery upon arriving at the destination is greater than a predetermined SOC, and after arriving at the destination, operate the battery to power a load external to the vehicle without the engine running for at least a predetermined time before requesting operation of the engine and the electric machine to charge the battery and power the load.

5. The vehicle of claim 1 wherein the controller is further programmed to begin increasing the lower SOC limit at a predetermined distance from the destination.

6. The vehicle of claim 1 wherein the controller is further programmed to decrease the lower SOC limit to a predetermined value in response to power generation at the destination.

7. An energy management system comprising:
a controller programmed to, in response to receiving a request to prepare for power generation at a destination prior to arriving at the destination, operate a battery according to a target state of charge (SOC) range defined by upper and lower SOC limits during a drive cycle to the destination, and increase the lower SOC limit at a rate to converge with the upper SOC limit upon reaching the destination.

8. The energy management system of claim 7 wherein the controller is further programmed to, in response to receiving the request, increase the upper SOC limit to a predetermined SOC.

9. The energy management system of claim 7 wherein the controller is further programmed to operate the battery such that the SOC of the battery upon arriving at the destination is greater than a predetermined SOC, and after arriving at the destination, operate the battery to power a load external to the vehicle without the engine running for at least a predetermined time before requesting operation of the engine and the electric machine to charge the battery and power the load.

10. The energy management system of claim 7 wherein the controller is further programmed to begin increasing the lower SOC limit at a predetermined distance from the destination.

11. The energy management system of claim 7 wherein the controller is further programmed to decrease the lower SOC limit to a predetermined value in response to power generation at the destination.

12. A method comprising:
operating, by a controller, a battery of a vehicle according to a target state of charge (SOC) range defined by upper and lower SOC limits during a drive cycle to a destination; and
increasing, by the controller, the lower SOC limit at a rate to converge with the upper SOC limit at the destination in response to receiving a request to prepare for power generation at the destination prior to arriving at the destination.

13. The method of claim 12 further comprising, in response to receiving the request, increasing the upper SOC limit to a predetermined SOC.

14. The method of claim 12 further comprising requesting, by the controller, operation of an engine and an electric machine to control a state of charge of the battery to the target SOC range.

15. The method of claim 12 further comprising operating, by the controller, the battery to power an external load after arriving at the destination without requesting operation of an engine and an electric machine for at least a predetermined time.

16. The method of claim 12 further comprising decreasing, by the controller, the lower SOC limit to a previous value when power generation at the destination begins.

17. The method of claim 12 further comprising increasing, by the controller, the lower SOC limit according to the distance from the destination when the distance from the destination is less than a predetermined distance.

* * * * *